United States Patent
Amano et al.

(10) Patent No.: US 11,194,235 B2
(45) Date of Patent: Dec. 7, 2021

(54) PROJECTOR

(71) Applicant: FUJIFILM Corporation, Tokyo (JP)

(72) Inventors: Masaru Amano, Saitama (JP); Yukiko Nagatoshi, Saitama (JP); Hironobu Kayano, Saitama (JP); Kenji Ito, Saitama (JP)

(73) Assignee: FUJIFILM Corporation, Tokyo (JP)

(*) Notice: Subject to any disclaimer, the term of this patent is extended or adjusted under 35 U.S.C. 154(b) by 57 days.

(21) Appl. No.: 16/887,744

(22) Filed: May 29, 2020

(65) Prior Publication Data

US 2020/0292923 A1    Sep. 17, 2020

Related U.S. Application Data

(63) Continuation of application No. PCT/JP2018/043789, filed on Nov. 28, 2018.

(30) Foreign Application Priority Data

Nov. 30, 2017  (JP) .............................. JP2017-230954
Oct. 18, 2018  (JP) .............................. JP2018-196769

(51) Int. Cl.
  *G03B 21/14*  (2006.01)
  *G03B 21/28*  (2006.01)
  (Continued)

(52) U.S. Cl.
  CPC .......... *G03B 21/142* (2013.01); *G02B 7/021* (2013.01); *G02B 7/182* (2013.01);
  (Continued)

(58) Field of Classification Search
  CPC .... G03B 21/14; G03B 21/142; G03B 21/006; G03B 21/28; H04N 9/31; H04N 9/3102; G02B 7/021; G02B 7/182; G02B 27/0955
  (Continued)

(56) References Cited

U.S. PATENT DOCUMENTS

2002/0176057 A1    11/2002   Baldwin et al.
2004/0012982 A1    1/2004    Kim
                   (Continued)

FOREIGN PATENT DOCUMENTS

CN    1498358 A    5/2004
CN    1511273 A    7/2004
                   (Continued)

OTHER PUBLICATIONS

International Preliminary Report on Patentability and Written Opinion of the International Searching Authority with an English translation (forms PCT/IB/373, PCT/ISA/237 and PCT/IB/326), dated Jun. 11, 2020, for corresponding International Application No. PCT/JP2018/043789.

(Continued)

*Primary Examiner* — William C. Dowling
(74) *Attorney, Agent, or Firm* — Birch, Stewart, Kolasch & Birch, LLP

(57) ABSTRACT

A projector includes a projection lens and a projector body. In the projection lens, a U-shaped optical path is formed by optical axis to optical axis. A lens barrel is a U-shaped barrel. A housing of the projector body includes a storage section. The projection lens is supported rotatably about the optical axis with respect to the housing, in an up-down direction and a right-left direction of the housing perpendicular to the optical axis, between a first position where the projection lens is stored inside a storage section provided in the housing and a second position where the projection lens is protruding from the housing.

19 Claims, 14 Drawing Sheets

(51) Int. Cl.
  *G02B 27/09* (2006.01)
  *G02B 7/02* (2021.01)
  *H04N 9/31* (2006.01)
  *G02B 7/182* (2021.01)

(52) U.S. Cl.
  CPC ......... *G02B 27/0955* (2013.01); *G03B 21/28* (2013.01); *H04N 9/3102* (2013.01)

(58) Field of Classification Search
  USPC .......................................... 353/98, 99, 101
  See application file for complete search history.

(56) References Cited

U.S. PATENT DOCUMENTS

| | | |
|---|---|---|
| 2004/0257539 A1 | 12/2004 | Peterson et al. |
| 2007/0081131 A1 | 4/2007 | Van Der Palen et al. |
| 2009/0122271 A1 | 5/2009 | Nagashima et al. |
| 2011/0285966 A1 | 11/2011 | Kamm |
| 2013/0094066 A1 | 4/2013 | Sakanashi et al. |
| 2013/0250251 A1 | 9/2013 | Kubota |
| 2015/0096181 A1 | 4/2015 | Plangger et al. |
| 2015/0131062 A1 | 5/2015 | Nishimori et al. |
| 2016/0246034 A1 | 8/2016 | Amano |
| 2016/0246037 A1 | 8/2016 | Amano |
| 2018/0217489 A1 | 8/2018 | Kuroda |
| 2019/0219915 A1* | 7/2019 | Kayano ................. G02B 7/023 |
| 2019/0346750 A1 | 11/2019 | Kuroda |
| 2020/0292924 A1* | 9/2020 | Amano ................ H04N 9/3141 |
| 2021/0149291 A1* | 5/2021 | Kayano ................ G03B 21/142 |

FOREIGN PATENT DOCUMENTS

| | | |
|---|---|---|
| CN | 101435980 A | 5/2009 |
| CN | 102253496 A | 11/2011 |
| CN | 103324011 A | 9/2013 |
| CN | 203606618 U | 5/2014 |
| CN | 104635410 A | 5/2015 |
| DE | 102012020404 A1 | 4/2013 |
| JP | 9-197341 A | 7/1997 |
| JP | 9-258134 A | 10/1997 |
| JP | 9-329841 A | 12/1997 |
| JP | 2003-280105 A | 10/2003 |
| JP | 2006-23361 A | 1/2006 |
| JP | 2006-201292 A | 8/2006 |
| JP | 2007-164097 A | 6/2007 |
| JP | 2007-515681 A | 6/2007 |
| JP | 2007-240678 A | 9/2007 |
| JP | 2007-525700 A | 9/2007 |
| JP | 2008-242401 A | 10/2008 |
| JP | 2011-180384 A | 9/2011 |
| JP | 2012-37674 A | 2/2012 |
| JP | 2012-118257 A | 6/2012 |
| JP | 2014-228618 A | 12/2014 |
| JP | 2016-156983 A | 9/2016 |
| JP | 2016-156986 A | 9/2016 |
| JP | 2017-142281 A | 8/2017 |
| KR | 10-2002-0033971 A | 5/2002 |
| WO | WO 2005/060269 A1 | 6/2005 |
| WO | WO 2005/067621 A2 | 7/2005 |
| WO | WO 2016/104331 A1 | 6/2016 |
| WO | WO 2017/056925 A1 | 4/2017 |
| WO | WO 2017/169903 A1 | 10/2017 |

OTHER PUBLICATIONS

International Search Report (form PCT/ISA/210), dated Jan. 29, 2019, for corresponding International Application No. PCT/JP2018/043789, with an English translation.
Extended European Search Report, dated Mar. 24, 2021, for corresponding European Application No. 18882493.2.
Japanese Office Action, dated Jan. 5, 2021, for corresponding Japanese Application No. 2019-216975, with an English translation.
Partial Supplementary European Search Report for corresponding European Application No. 18882493.2, dated Dec. 21, 2020.
Chinese Office Action and Search Report, dated Apr. 13, 2021, for corresponding Chinese Application No. 201880077455 X, with an English translation of the Chinese Office Action.

* cited by examiner

PROJECTOR

CROSS-REFERENCE TO RELATED APPLICATIONS

This application is a Continuation of PCT International Application No. PCT/JP2018/043789 filed on 28 Nov. 2018, which claims priority under 35 U.S.C § 119(a) to Japanese Patent Applications No. 2017-230954 filed on 30 Nov. 2017 and No. 2018-196769 filed on 18 Oct. 2018. The above application is hereby expressly incorporated by reference, in its entirety, into the present application.

BACKGROUND OF THE INVENTION

1. Field of the Invention

The present invention relates to a projector.

2. Description of the Related Art

In recent years, a projector on which an image forming panel, such as a liquid crystal display or a digital micromirror device (DMD), is mounted has been widespread and the performance of the projector has been improved.

JP2016-156986A (corresponding to US2016/246037A1) discloses a liquid crystal projector that irradiates a transmission-type liquid crystal panel with light emitted from a light source and enlarges and projects an image, which is displayed on the liquid crystal panel, onto a screen through a projection lens.

A liquid crystal projector of JP2016-156986A includes a projection lens which has two reflective members that bend an optical axis, so that light flux from a liquid crystal panel illuminated by a light source is bent into a U shape by the two reflective members and projected onto a screen. The U-shaped projection lens can reduce the size of the projector body and the size of the entire projector system including the projector and the screen.

SUMMARY OF THE INVENTION

However, in the projector of JP2016-156986A, in order to avoid interference between the optical path of the projection lens and the projector body, the projection lens is disposed at a position where its tip end side (projection side optical system) projects from the projector body. Accordingly, the projection lens protrudes from the projector body and becomes large, which may interfere with transportation of the projector. In addition, the optical system and the lens barrel may be damaged due to contact, and since the end face of the projection optical system is exposed when not in use, there is a concern that dust or the like may be attached.

The invention has been made in consideration of the above-mentioned circumstances, and an object of the invention is to provide a compact projector that can be hardly obstructive when it is not in use.

In order to achieve the object, a projector of the present application includes an image forming panel, a light source, a housing having a first surface and a second surface intersecting the first surface, and a projection lens having a first holding member through which light with a first optical axis passes, a first reflective member which bends the first optical axis to form a second optical axis, and a second holding member through which the light with the second optical axis passes. The projection lens is rotatable around the first optical axis between a first position where the second holding member faces along the long side direction of the first surface and a second position where the second holding member protrudes from the second surface in a side view. The image forming panel is a panel for displaying images. The light source illuminates the image forming panel. The housing houses the image forming panel and the light source.

In order to achieve the object, a projector of the present application includes an image forming panel, a light source, a housing, and a projection lens. The projection lens is rotatably supported around a first optical axis with respect to a first surface of the housing in an up-down direction and a right-left direction of the housing perpendicular to the first optical axis, between a first position where the projection lens is stored inside the housing and a second position where the projection lens is protruding from the housing. The image forming panel is a panel for displaying images. The light source illuminates the image forming panel. The housing houses the image forming panel and the light source. The projection lens has a first reflective member that bends a first optical axis to 90° to form a second optical axis, and a second reflective member that bends the second optical axis to 90° to form a third optical axis, and bends a light beam from the image forming panel illuminated by the light source into a U-shape by the first reflective member and the second reflective member to project the light beam onto the projection target.

It is preferable that the projection lens has a first optical system having the first optical axis in which the light beam from the image forming panel is incident and guided to the projection target side, a second optical system having the second optical axis in which the light beam from the first optical system is incident and guided to the projection target side, and a third optical system having the third optical axis in which the light beam from the second optical system is incident and projected onto the projection target, and the third optical system is located on the same side as the light source with respect to the first optical axis in the right-left direction when the projection lens is at the first position.

It is preferable that the light source is disposed at a position protruding toward the projection lens side with respect to the housing, from the front end surface of the optical system on the image forming panel side of the projection lens, in a front-back direction of the housing which is orthogonal to the up-down direction and the right-left direction.

It is preferable that the projection lens is disposed inside a storage section provided in the housing when the projection lens is at the first position.

It is preferable that the storage section is an opening formed by cutting a part of the housing.

It is preferable to further include a cover member that is connected to the housing and covers the projection lens when the projection lens is at the first position.

It is preferable to further include a control unit that supplies power to each part of the housing when the projection lens is rotated from the first position to the second position, and stops supplying power to each part in the housing when the projection lens is rotated from the second position to the first position.

It is preferable to further include a drive unit that drives the projection lens between the first position and the second position; an operation switch for starting and stopping power supply to each part of the housing, and a control unit that controls the drive unit to drive the projection lens from the first position to the second position after the power supply is started when the operation switch is turned on, and controls the drive unit to drive the projection lens from the second position to the first position and then stops the power supply when the operation switch is turned off.

It is preferable that the light in the projection lens has the first optical axis, the second optical axis, and a third optical axis that travels in a direction opposite to the traveling direction of the first optical axis.

It is preferable that the first surface is between the light source and the projection lens when the projection lens is at the first position.

It is preferable that the projection lens is attached to the housing in a first direction, a second direction is the direction intersecting the first direction, and a mounting position of the projection lens to the housing is shifted from the center position of the housing in the second direction in a plan view.

It is preferable that the housing has a central section and a protruding section protruding from the central section, and a side where the protruding section is located with respect to the center position and a side where the mounting position is located with respect to the center position are the same side in a plan view.

It is preferable that the housing has a central section and a protruding section protruding from the central section, and light emitted from the light source enters the projection lens using the central section and the protruding section as an optical path.

It is preferable that the light emitted from the light source is superimposed on the projection lens before entering the projection lens.

It is preferable to further include an operation button for operating the projector, or an operation switch for switching on/off the power supply to the projector, and it is preferable that the housing has a central section and a protruding section protruding from the central section, and the operation switch or the operation button is formed in the protruding section.

It is preferable that the diameter of an exit lens at the tip of the projection lens is shorter than the length of the first surface in the short side direction.

It is preferable that the end of the projection lens is inside the end of the first surface in the long side direction in the side view, when the projection lens is at the first position.

It is preferable that the housing has a central section and a protruding section protruding from the central section, the protruding section has a first protruding section connected to the central section and a second protruding section connected to the first protruding section, and the projection lens is between the central section and the second protruding section in a plan view when the projection lens is at the first position.

According to the invention, it can be provided a compact projector that can be hardly obstructive when it is not in use, such as during transportation.

DESCRIPTION OF THE PREFERRED EMBODIMENTS

First Embodiment

Figure 1:
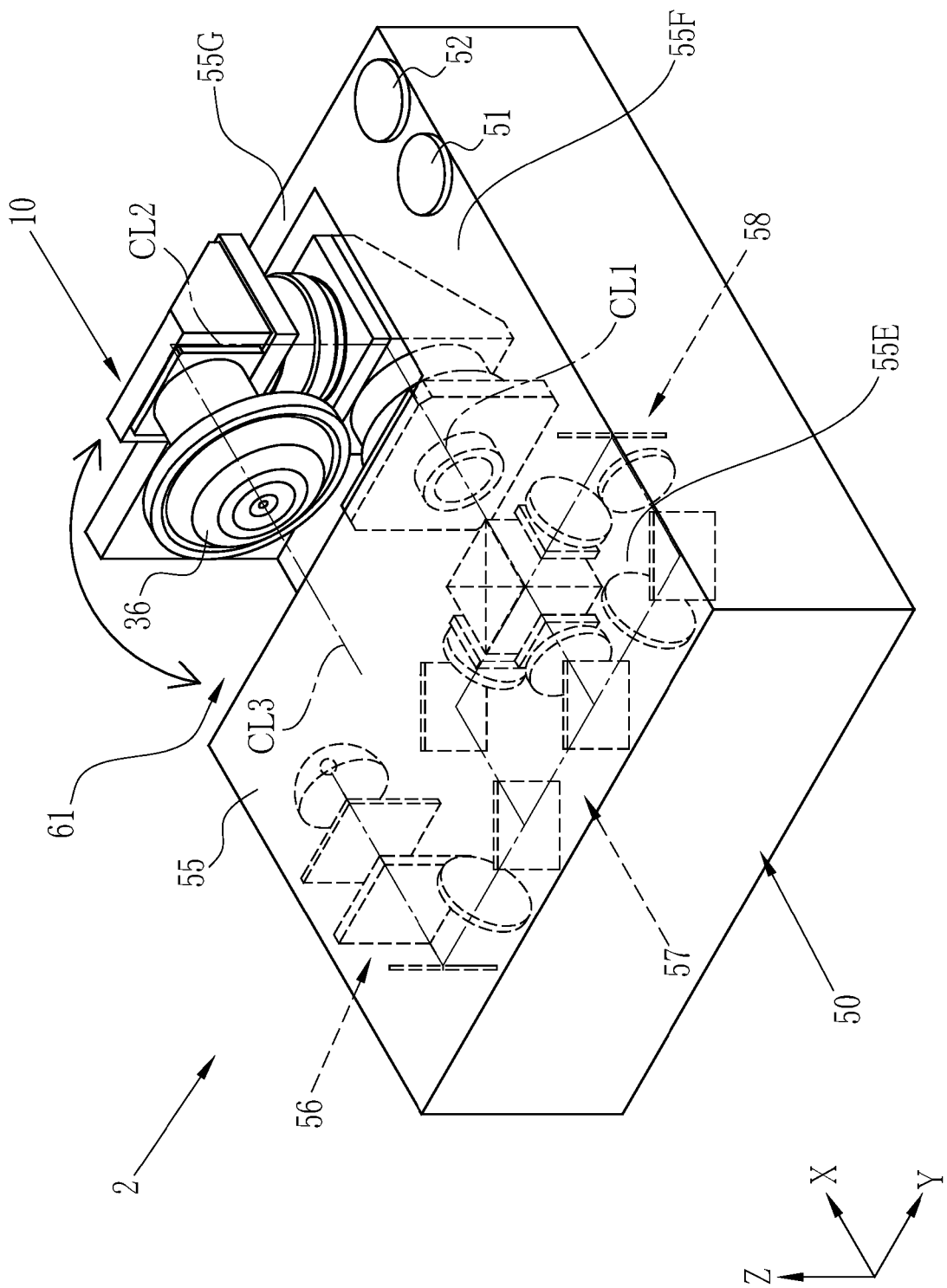
FIG. 1 is a perspective view showing a usage state of a projector of the present application.
Figure 2:
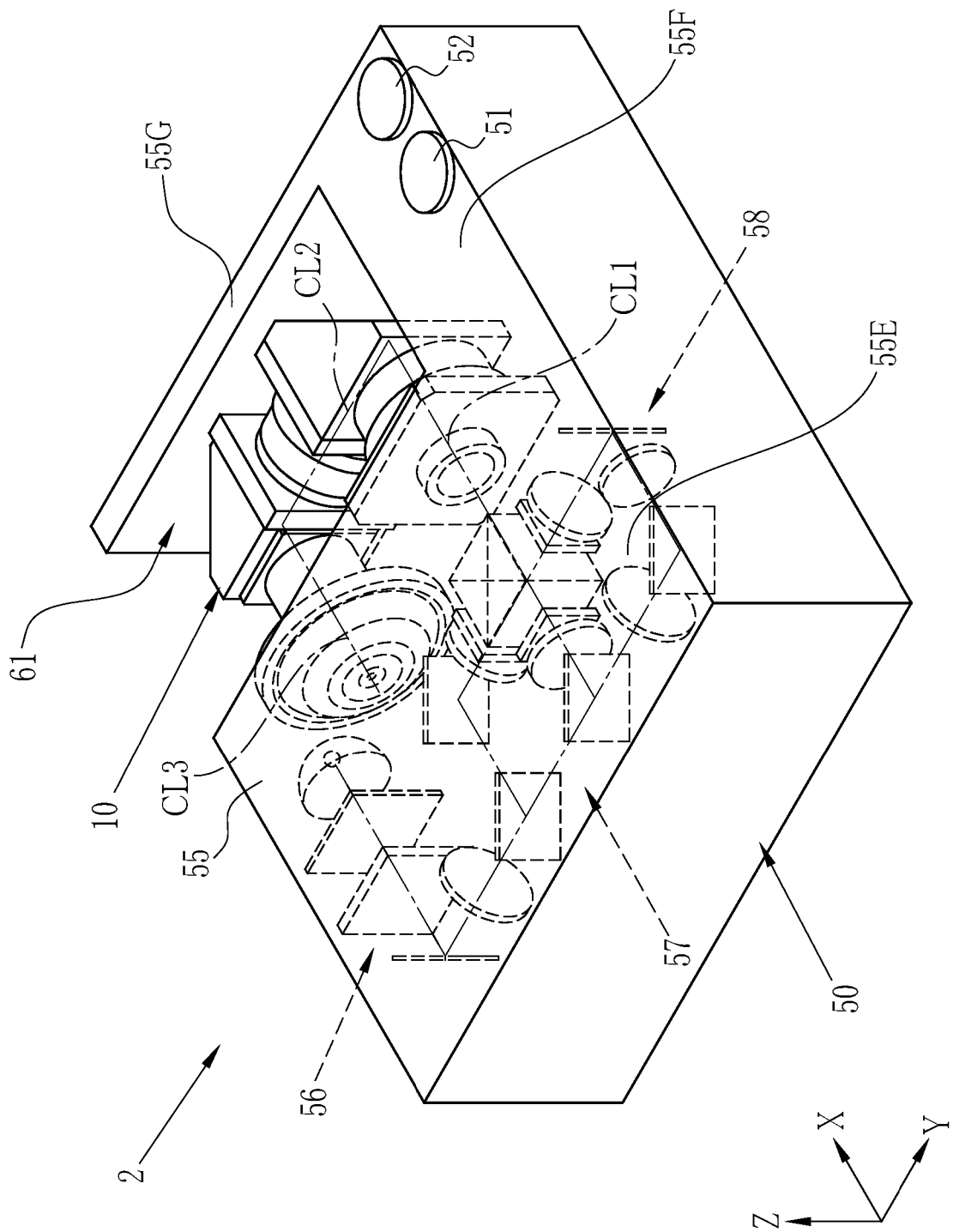
FIG. 2 is a perspective view showing a storage state of the projector.

As shown in FIGS. 1 and 2, a projector 2 of this embodiment includes a projection lens 10, and a projector body 50.

Figure 3:
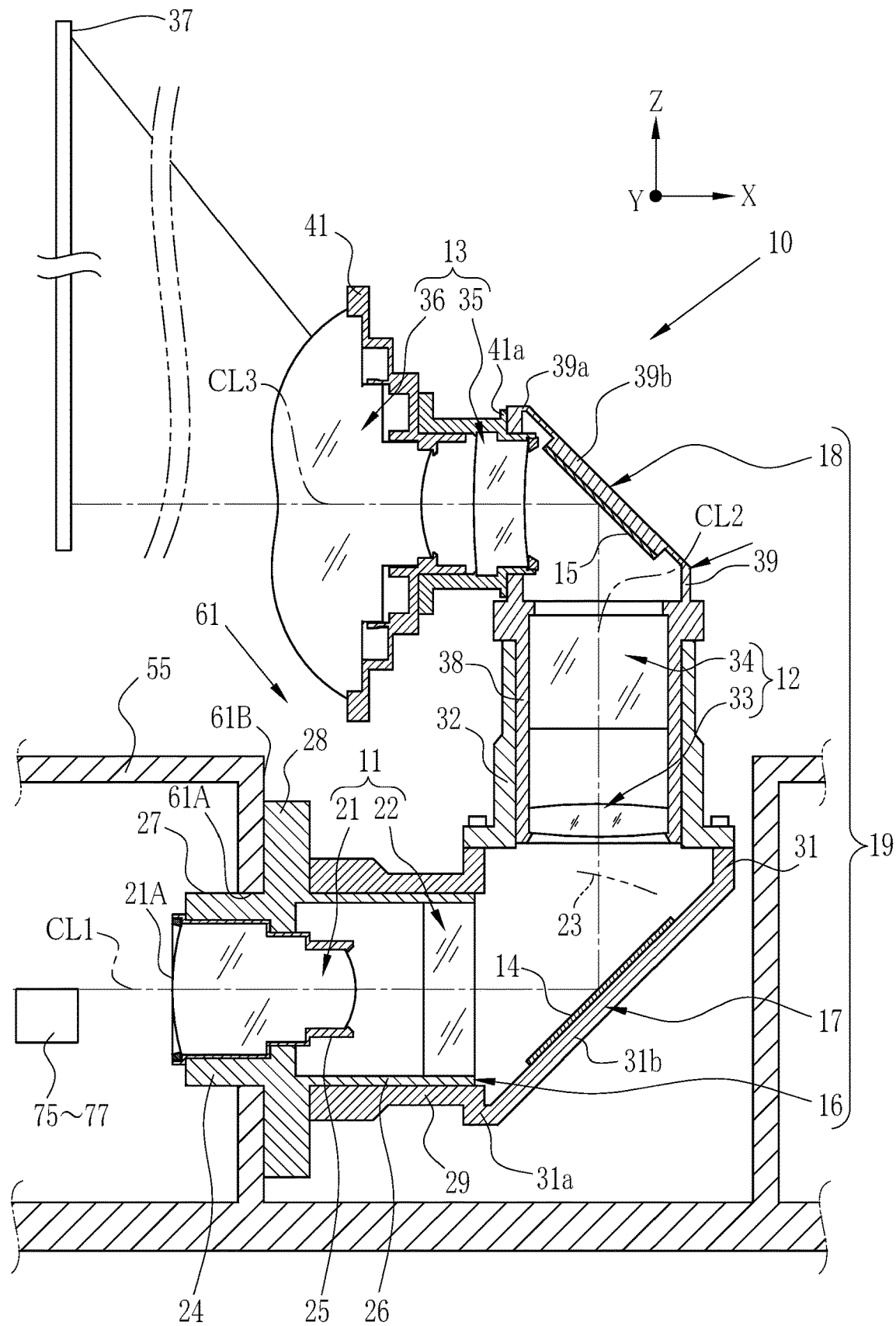
FIG. 3 is a longitudinal sectional view of a main part of the projector.

As shown in FIG. 3, the projection lens 10 includes a first optical system 11, a second optical system 12, a third optical system 13, a first mirror 14 serving as a first reflective member, a second mirror 15 serving as a second reflective member, a first holding member 16, a second holding member 17, and a third holding member 18. The first to third holding members 16 to 18 form a lens barrel 19.

The first optical system 11 includes a first lens 21 and a second lens 22. Each of these first and second lenses 21 and 22 is shown as a single lens for simplification in the figure, but is actually formed of a plurality of lens groups. In the first optical system 11, light beams from image forming panels 75 to 77 are incident and guided to the projection target side. In this embodiment, the first optical system 11 forms an image, which is formed on the image forming panels 75 to 77, on an imaging plane 23 as an intermediate image.

The first holding member 16 integrally holds the first optical system 11. The first holding member 16 includes a first body part 24, a first lens frame 25, and a first mounting tube 26. And the light with an optical axis CL1 passes through the first holding member 16. The first lens frame 25 holds the first lens 21. The first body part 24 has a fitting portion 27 and a mounting flange 28 and holds the first lens frame 25 in the center. The fitting portion 27 fits into a fitting hole 61A provided in a housing 55 of the projector body 50.

The fitting hole 61A is a through-hole opened from a mounting surface 61B (a first surface), which is a side surface of the housing 55, to the inside of the housing 55. The mounting surface 61B is a surface that constitutes a storage section 61 provided in the housing 55 described later, and is a surface on the side where the image forming panels 75 to 77 are located in the storage section 61.

The first holding member 16 is inserted until the mounting flange 28 is abutted against the mounting surface 61B with the fitting portion 27 fitted into the fitting hole 61A, and the mounting flange 28 is fixed to the housing 55 for example by screwing. The first holding member 16 attached to the housing 55 is inserted to the position where a tip face 21A of the first lens 21 (a tip face on the image forming panels 75 to 77 side) is placed inside the housing 55.

The first mounting tube 26 is connected to the first body part 24 and holds the second lens 22 inside. The first mounting tube 26 has a cylindrical shape, and the central axis coincides with the optical axis CL1 of the first optical system 11. The second holding member 17 is attached to the first mounting tube 26 as described later.

The second holding member 17 holds the first mirror 14 integrally. The second holding member 17 has a second mounting tube 29, a second body part 31, and a third mounting tube 32. The second mounting tube 29 has a cylindrical shape, and its inner peripheral surface is rotatably fitted to the outer peripheral surface of the first mounting tube 26. That is, the second holding member 17 is supported rotatably about the optical axis CL1 of the first optical system 11, with the first mirror 14, the third holding member 18 described later, the second optical system 12, the third optical system 13, and the second mirror 15. The second holding member 17 passes light with an optical axis CL2 obtained by bending the optical axis CL1. Note that a retaining member (not shown) is provided between the first mounting tube 26 and the second mounting tube 29, so that the second mounting tube 29 is prevented from detaching from the first mounting tube 26 in a direction parallel to the optical axis CL1.

The second body part 31 is connected to the second mounting tube 29. The second body part 31 is formed of a square tube having a substantially rectangular parallelepiped shape. One corner of a lower plate 31a of the second body part 31 is cut obliquely, so that an inclined surface portion 31b is formed. The first mirror 14 is fixed to the inner surface of the inclined surface portion 31b.

The first mirror 14 is arranged between the first optical system 11 and the imaging plane 23 of the intermediate image by the first optical system 11. The first mirror 14 bends the optical axis CL1 of the first optical system 11 by reflection to the optical axis CL2. In this embodiment, the first mirror 14 bends the optical axis CL1 by 90° to the optical axis CL2.

The third mounting tube 32 is fixed to the second body part 31 by for example screwing, and is arranged orthogonal to the second mounting tube 29 through the second body part 31. The third mounting tube 32 has a cylindrical shape, and to which the third holding member 18 is attached.

The third holding member 18 holds the second optical system 12, the second mirror 15, and the third optical system 13 integrally. The second optical system 12 is composed of a third lens 33 and a fourth lens 34. The third optical system 13 is composed of a fifth lens 35 and a sixth lens 36. The sixth lens 36 is located at the tip of the projection lens 10 and corresponds to an exit lens that emits light. Each of the third to sixth lenses 33 to 36 is shown as a single lens for simplification in the figure, but is actually formed of a plurality of lens groups.

The second optical system 12 receives the light beam from the first optical system 11 and guides it to the projection target side. The third optical system 13 receives the light beam from the second optical system 12 and guides it to the projection target side. In this embodiment, the second optical system 12 and the third optical system 13 enlarge the intermediate image, which is formed on the imaging plane 23 by the first optical system 11, and projects the enlarged intermediate image onto, for example, a screen 37 that is a projection target. The first to third optical systems 11 to 13 are described in detail, for example, in "Projection Optical System and Projection Display Device" of JP2016-156986A (corresponding to US2016/246037A1), JP2016-156983A (corresponding to US2016/246034A1), or the like, and optical systems described in these can be used as the first to third optical systems 11 to 13.

The second mirror 15 is arranged between the second optical system 12 and the third optical system 13. The second mirror 15 bends the optical axis CL2 by reflection to an optical axis CL3. In this embodiment, the second mirror 15 bends the optical axis CL2 by 90° to the optical axis CL3.

In this embodiment, as described above, the optical axis CL1 on the incident side of the first optical system 11 is reflected by the first mirror 14 and bent by 90° to become the optical axis CL2 on the output side. The optical axis CL2 on the incident side of the second optical system 12 is reflected by the second mirror 15 and bent by 90° to become the optical axis CL3 on the output side. Accordingly, the optical axis CL3 is parallel to the optical axis CL1 in a plane including the optical axis CL1 and the optical axis CL2. That is, the projection lens 10 projects the light beam from the image forming panels 75 to 77 illuminated by the a light source 62 onto the projection target by bending the optical axis with the first mirror 14 and the second mirror 15. Note that the optical axes CL1 to CL3 correspond to first to third optical axes of the invention.

Furthermore, since the projection lens 10 has a U-shaped optical path, the lens barrel 19, which holds the first optical system 11, the second optical system 12, the first mirror 14, and the second mirror 15, is a U-shaped barrel.

The third holding member 18 has a second lens frame 38, a third body part 39, and a third lens frame 41. The second lens frame 38 has a cylindrical shape and holds the second optical system 12, that is, the third lens 33 and the fourth lens 34. The outer peripheral surface of the second lens frame 38 fits into the inner peripheral surface of the third mounting tube 32.

The third body part 39 is connected to the second lens frame 38. The third body part 39 is formed of a square tube having a substantially rectangular parallelepiped shape. One corner of an upper plate 39a of the third body part 39 is cut obliquely, so that an inclined surface portion 39b is formed. The second mirror 15 is fixed to the inner surface of the inclined surface portion 39b.

The third lens frame 41 holds the third optical system 13, that is, the fifth lens 35 and the sixth lens 36. Further, a flange 41a is formed at the incidence-side end face of the third lens frame 41. The third lens frame 41 is fixed by, for example, screwing the flange 41a to the third body part 39, and is arranged perpendicular to the second lens frame 38 through the third body part 39.

Note that in this embodiment, the third lens 33 and the fourth lens 34 constituting the second optical system 12 are arranged between the first mirror 14 and the second mirror 15. However, the projection lens 10 only needs to have a U-shaped optical path. For example, the lens constituting the second optical system 12 may not be arranged between the first mirror 14 and the second mirror 15.

As shown in FIGS. 1 and 2, the housing 55 of the projector body 50 has a central section 55E and a first protruding section 55F, and the first protruding section 55F includes a power switch 51, an operation button 52 and so on. By being provided at the protruding section, the user can easily operate buttons and switches.

The projector body 50 contains a light source unit 56, a color separation unit 57, an image forming unit 58, and a control unit 59 (see FIG. 6) in the housing 55. In the following description, the optical axis CL1 corresponds to an X-axis direction (first direction), an up-down direction of the housing 55 orthogonal to the X-axis direction is referred to as a Z-axis direction, and a lateral direction of the housing 55 orthogonal to the X-axis direction and the Z-axis direction is referred to as a Y-axis direction (second direction).

The housing 55 is provided with a storage section 61. The storage section 61 is an opening formed by cutting a part of the housing 55. Specifically, the opening is cut out from an upper surface 55A and one side surface 55C. The upper surface 55A is a second surface of the housing 55 having a substantially rectangular parallelepiped shape. The upper surface 55A, which is the second surface, intersects the mounting surface 61B, which is the first surface. The storage section 61 is an opening having a square cross section formed in accordance with the outer shape of the projection lens 10.

The projection lens 10 is attached to the mounting surface 61B in the X-axis direction (first direction). Since the first mounting tube 26 and the second mounting tube 29 are pivotably fitted as mentioned above, the projection lens 10 is rotatably supported around the optical axis CL1 between a second position (protruding position) where the optical axis CL2 is parallel to the Z-axis direction (the state shown in FIG. 1) and a first position (storage position) where the optical axis CL2 is parallel to the Y-axis direction (the state shown in FIG. 2).

Figure 4:
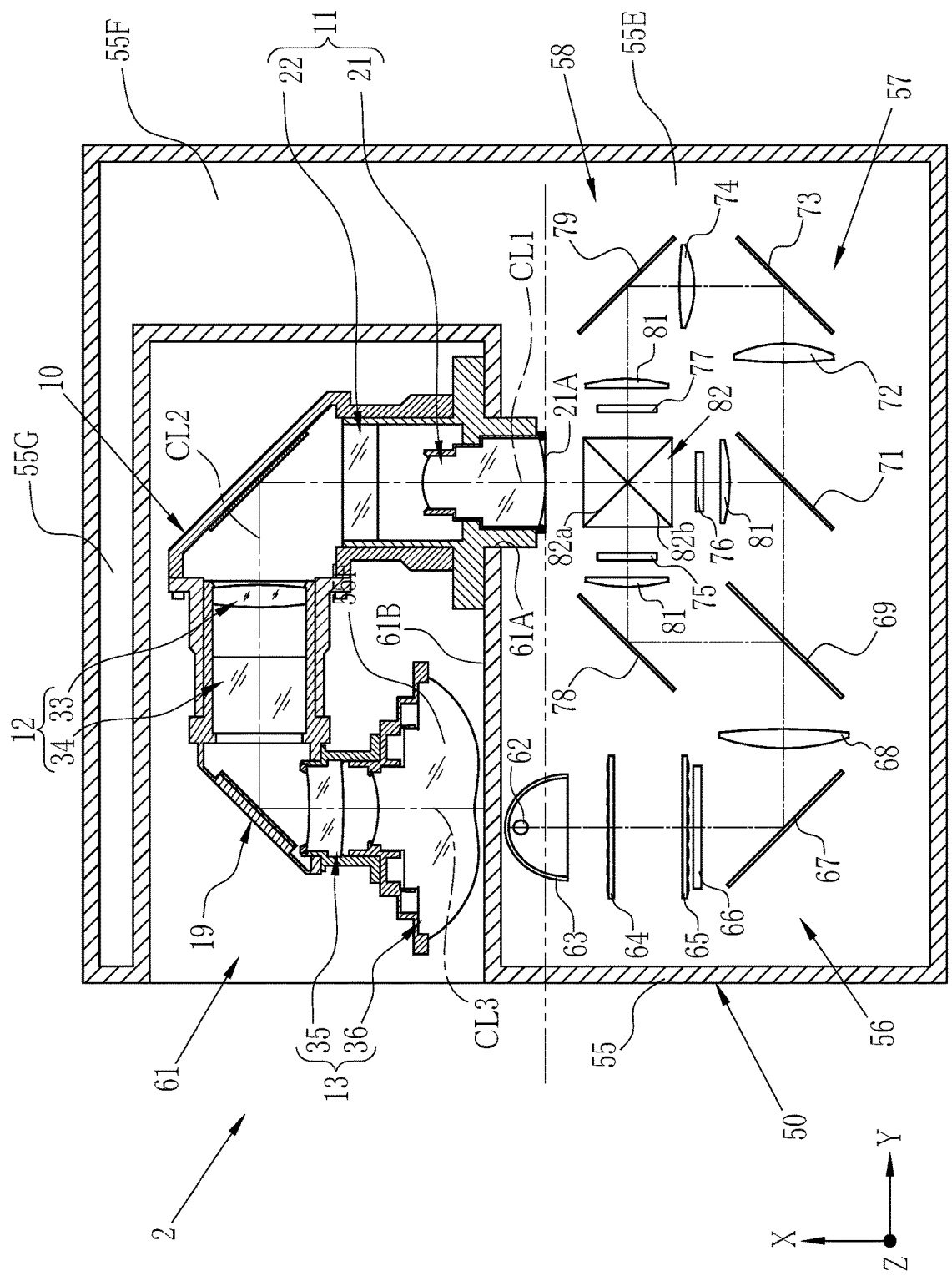
FIG. 4 is a cross-sectional view of the main part of the projector.
Figure 5A:
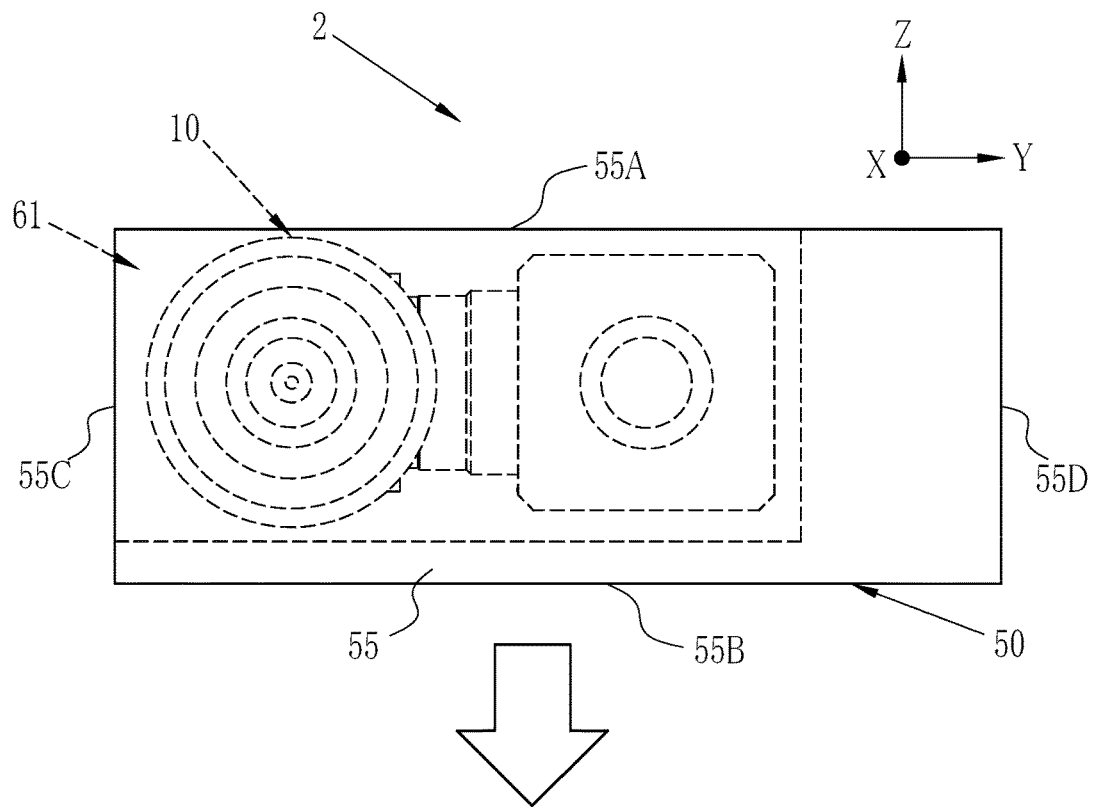
FIGS. 5A and 5B are front views of the projector for explaining a rotation of a projection lens from a first position (FIG. 5A) to a second position (FIG. 5B).

As shown in FIGS. 4 and 5A, when the projection lens 10 is at the first position, the second holding member 17 faces along the long side direction of the mounting surface 61B of the housing 55 (see FIG. 3). Accordingly, in the state shown in FIG. 5A, the projection lens 10 is arranged inside the storage section 61. Specifically, the projection lens 10 is housed in a position where it does not protrude from the upper surface 55A, a bottom surface 55B and the side surfaces 55C, 55D of the housing 55 in the Z-axis direction and the Y-axis direction. In other words, the diameter of the sixth lens 36 (see FIG. 5B) located at the tip of the projection lens 10 is shorter than the length of the mounting surface 61B in the short side direction. In addition, in the side view, the end of the projection lens 10 is located inside the long side end of the mounting surface 61B.

Figure 5B:
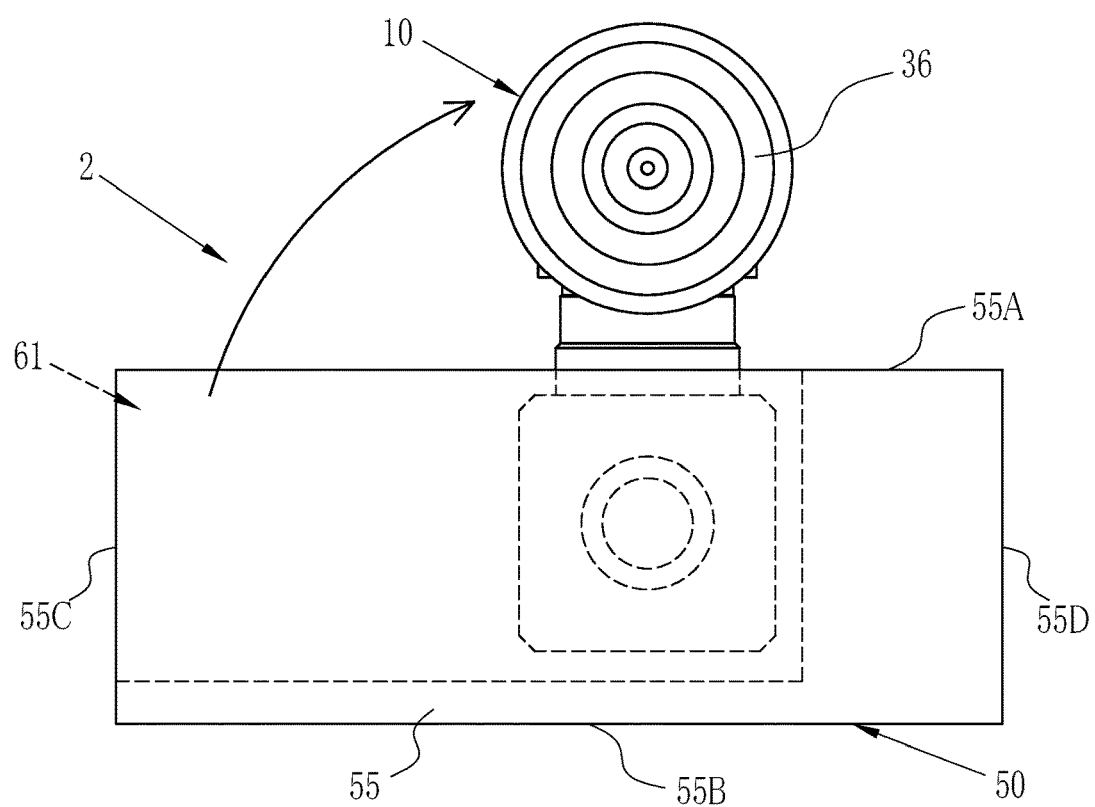

As shown in FIG. 5B, when the projection lens 10 including the second holding member 17 is at the second position, the projection lens 10 is disposed at a position protruding from the upper surface 55A of the housing 55 in the side view. Specifically, the projection lens 10 projects from the upper surface 55A of the housing 55 in the Z-axis direction, and the sixth lens 36 of the third optical system 13 is exposed.

With the above configuration, since the third optical system 13 is exposed when the projection lens 10 is at the second position, the light path of the projection lens 10 and the projector body 50 do not interfere with each other so that the light beam can be projected onto the projection target. On the other hand, when the projection lens 10 is at the first position, the projection lens 10 is housed in a position that does not protrude from the housing 55, so that the projector 2 can be made compact without the projection lens 10 being an obstacle during transportation of the projector 2. Further, damage due to contact between the sixth lens 36 and the lens barrel 19 can be prevented. Furthermore, when the projection lens 10 is at the first position, since it is stored in a position that does not protrude from the housing 55, the sixth lens 36 is not exposed so that performance degradation due to dust or the like adhering to the lens surface of the sixth lens 36 can be prevented.

As shown in FIG. 4, the light source unit 56 includes the light source 62 that emits light, and supplies light from the light source 62 to the color separation unit 57. The color separation unit 57 separates light emitted from the light source unit 56 into three color lights of red, green, and blue. Each color light of red, green, and blue separated by the color separation unit 57 is given an image by the image forming unit 58, exits from the projection lens 10, and is projected on the screen 37.

The light source unit 56 includes the light source 62, a reflector 63, a pair of fly-eye lenses 64 and 65, a polarization converting element 66, a mirror 67, a condenser lens 68, and so on. The light source 62 is a high-intensity lamp such as a xenon lamp, a metal halide lamp, or a super high-pressure mercury lamp, and emits natural white light having no specific polarization direction. The reflector 63 condenses the irradiation light irradiated by the light source 62 in one direction.

Since the light path of irradiation light is bent by the mirror 67 etc., the light source 62 is offset with respect to the optical axis CL1 of the projection lens 10, and is arranged at a different position from the first optical system 11 in the Y-axis direction. Further, the light source 62 is arranged in the X-axis direction at a position protruding to the projection lens 10 side than the tip face 21A of the first lens 21 of the projection lens 10.

As described above, the projection lens 10 has the optical paths of the first optical axis CL1 traveling in the X-axis direction (the first direction), of the second optical axis CL2 traveling in the Y-axis direction (the second direction), and of the third optical axis CL3 traveling in the opposite direction of the first optical axis CL1. As shown in FIG. 4, since it has the U-shaped optical path, when the projection lens 10 is set to the first position, the optical axis CL3 of the third optical system 13 on the projection side is offset from the optical axis CL1 of the first optical system 11. That is, when the projection lens 10 is set to the first position, the third optical system 13 is arranged in a position shifted from the first optical system 11 in the Y-axis direction. In this embodiment, when the projection lens 10 is at the first position, the third optical system 13 is positioned on the same side as the light source 62 with respect to the optical axis CL1 in the Y-axis direction. In addition, the mounting surface 61B is located between the projection lens 10 and the light source 62.

With the above configuration, since the third optical system 13 and the light source 62 are positioned on the same side of the optical axis CL1 in the Y-axis direction when the projection lens 10 is at the first position, the dimension in the Y-axis direction can be reduced, and the projector 2 as a whole can be made compact. Further, since the light source 62 is arranged at a position protruding to the projection lens 10 side than the tip face 21A of the first lens 21 in the X-axis direction, also the size in the X-axis direction can be reduced, contributing to compactness.

The fly-eye lenses 64 and 65 make the light beam converged by the reflector 63 substantially parallel. The fly-eye lenses 64 and 65 are composed of a microlens array or the like, uniformize the light amount distribution in the irradiation surface of the incident irradiation light, and cause the irradiation light to enter the polarization converting element 66.

The polarization converting element 66 aligns the polarization direction of the incident irradiation light. The irradiation light whose polarization direction is aligned by the polarization converting element 66 is incident on the mirror 67. The mirror 67 changes the direction of the incident irradiation light by reflection. The condenser lens 68 directs the irradiation light, changed in direction by the mirror 67, to the color separation unit 57. Accordingly, the irradiation light is supplied from the light source unit 56 to the color separation unit 57.

The color separation unit 57 includes two dichromic mirrors 69 and 71, a relay lens 72, a mirror 73, and a relay lens 74. The color separation unit 57 separates the irradiation light emitted from the light source unit 56 into red (R), green (G), and blue (B) color lights by the dichromic mirrors 69 and 71.

The dichromic mirror 69 is arranged so that the irradiation light supplied from the light source unit 56 is incident thereon. Further, the dichromic mirror 69 is formed in a substantially plate shape, and is inclined at approximately 45 degrees with respect to the optical axis of the irradiation light. The dichromic mirror 69 has the property of reflecting red light and transmitting green light and blue light. Therefore, of the irradiation light that is white light, only the red light component is reflected, and the green light component and the blue light component are transmitted.

The red light reflected by the dichromic mirror 69 goes to the image forming unit 58. On the other hand, the green light and the blue light transmitted through the dichromic mirror 69 go to the dichromic mirror 71.

Like the dichromic mirror 69, the dichromic mirror 71 is formed in a substantially plate shape, and is inclined by approximately 45 degrees with respect to the optical axis of the irradiation light. The dichromic mirror 71 has the property of reflecting green light and transmitting blue light. Therefore, of the green light component and the blue light component of the irradiation light transmitted through the dichromic mirror 69, the green light component is reflected and the blue light component is transmitted.

The green light reflected by the dichromic mirror 71 goes to the image forming unit 58. On the other hand, the blue light transmitted through the dichromic mirror 71 is guided to the relay lens 72 and heads for the mirror 73. Like the dichromic mirrors 69 and 71, the mirror 73 is formed in a substantially plate shape, and is inclined at approximately 45 degrees with respect to the optical axis of the irradiation light. The blue light reflected by the mirror 73 is guided to the relay lens 74 and heads for the image forming unit 58.

The image forming unit 58 is composed of an image forming panel 75 for red light, an image forming panel 76 for green light, an image forming panel 77 for blue light, mirrors 78, 79, a condenser lens 81, a cross dichroic prism 82, and so on.

Of the three color lights separated by the dichromic mirrors 69 and 71, the red light goes to the image forming panel 75 for red light via the mirror 78, the green light goes to the image forming panel 76 for green light via the condenser lens 81, and the blue light goes to the image forming panel 77 for blue light via the mirror 79 and the condenser lens 81.

The image forming panel 75 for red light is, for example, a transmission-type LCD, and is disposed between the condenser lens 81 and the cross dichroic prism 82. The image forming panel 75 for red light generates red image light with image information of red component by modulating the transmitted red light, and makes the red image light incident on the cross dichroic prism 82.

The image forming panel 76 for green light, which has the same configuration as the image forming panel 75 for red light, generates green image light with image information of green component by modulating the transmitted green light, and makes the green image light incident on the cross dichroic prism 82. The image forming panel 77 for blue light, which has the same configuration as the image forming panel 75 for red light, generates blue image light with image information of blue component by modulating the transmitted blue light, and makes the blue image light incident on the cross dichroic prism 82.

The cross dichroic prism 82 is formed in a substantially cubic shape using a transparent material such as glass, and includes dichroic surfaces 82a and 82b that cross each other. The dichroic surface 82b has a characteristic of reflecting red light and transmitting green light and blue light. The dichroic surface 82a has a characteristic of reflecting blue light and transmitting red light and green light. The red image light incident on the cross dichroic prism 82 is reflected by the dichroic surface 82b and incident on the projection lens 10. The green image light passes through the dichroic surfaces 82a and 82b and enters the projection lens 10. The blue image light is reflected by the dichroic surface 82a and is incident on the projection lens 10.

In this way, the cross dichroic prism 82 causes the incident image light of each color to be incident on the projection lens 10 as combined image light on the same optical axis. As a result, the combined image light to which image information of each color of red, green, and blue is given is projected by the projection lens 10, and a full-color image is displayed on a screen or the like.

As shown in FIG. 4, the housing 55 accommodates the light source 62, the cross dichroic prism 82, and so on, and is divided into a central section 55E to which the projection lens 10 is connected and a protruding section protruding from the central section 55E. The protruding section has the first protruding section 55F and a second protruding section 55G connected to the first protruding section 55F. The projection lens 10 is positioned between the central section 55E and the second protruding section 55G. Accordingly, the housing 55 protects the projection lens 10. Further, the mounting position of the projection lens 10 (the center of the fitting hole 61A) is shifted from the center position of the Y-axis direction (the second direction) of the housing 55. More specifically, the mounting position of the projection lens 10 and the first protruding section 55F are located on the same side with respect to the center position in the Y-axis direction (the second direction) of the housing 55. With this arrangement, the housing 55 can accommodate the projection lens 10 with a large size.

Figure 6:
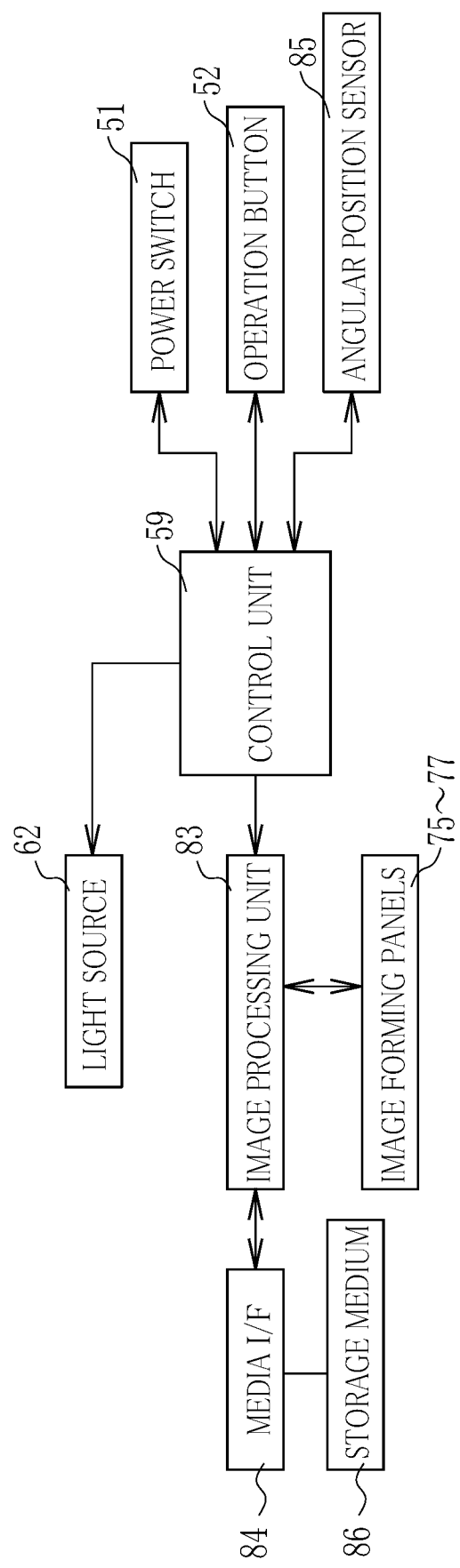
FIG. 6 is a block diagram showing an electrical configuration of the projector.

As shown in FIG. 6, the projector body 50 is provided with the control unit 59, the power switch 51, the operation button 52, the light source 62, the image forming panels 75 to 77, an image processing unit 83, an media I/F (interface) 84, and an angular position sensor 85.

The image processing unit 83 is controlled by the control unit 59 to process the image data from a storage medium 86 read by the media I/F 84 and display the RGB three-color image on the image forming panels 75 to 77. The image processing unit 83 also adjusts the size of the image projected on the screen 37 upon operation of the operation button 52.

When the power switch 51 is turned on, the control unit 59 starts to detect the angular position of the projection lens 10 by the angular position sensor 85. The angular position sensor 85 detects the angular position of the projection lens 10 around the optical axis CL1.

When the projection lens 10 is at the first position, the control unit 59 does not supply power to each part in the housing 55 such as the light source 62 and the image forming panels 75 to 77. When the angular position sensor 85 detects that the projection lens 10 has been rotated from the first position to the second position, the control unit 59 supplies power to each part in the housing 55. When the angular position sensor 85 detects that the projection lens 10 has been rotated from the second position to the first position, the control unit 59 stops supplying power to each part in the housing 55.

With the above configuration, when the power switch 51 is turned on, the control unit 59 lights the light source 62 and drives the image forming panels 75 to 77 and so on just by rotating the projection lens 10 from the first position to the second position. Therefore, the projection onto the screen can be started immediately. To end projection on the screen, the light source 62 is turned off and drive of the image forming panels 75 to 77 is stopped just by rotating the projection lens 10 from the second position to the first position. Therefore, it can be prevented from forgetting to turn off the light source 62.

Figure 7:
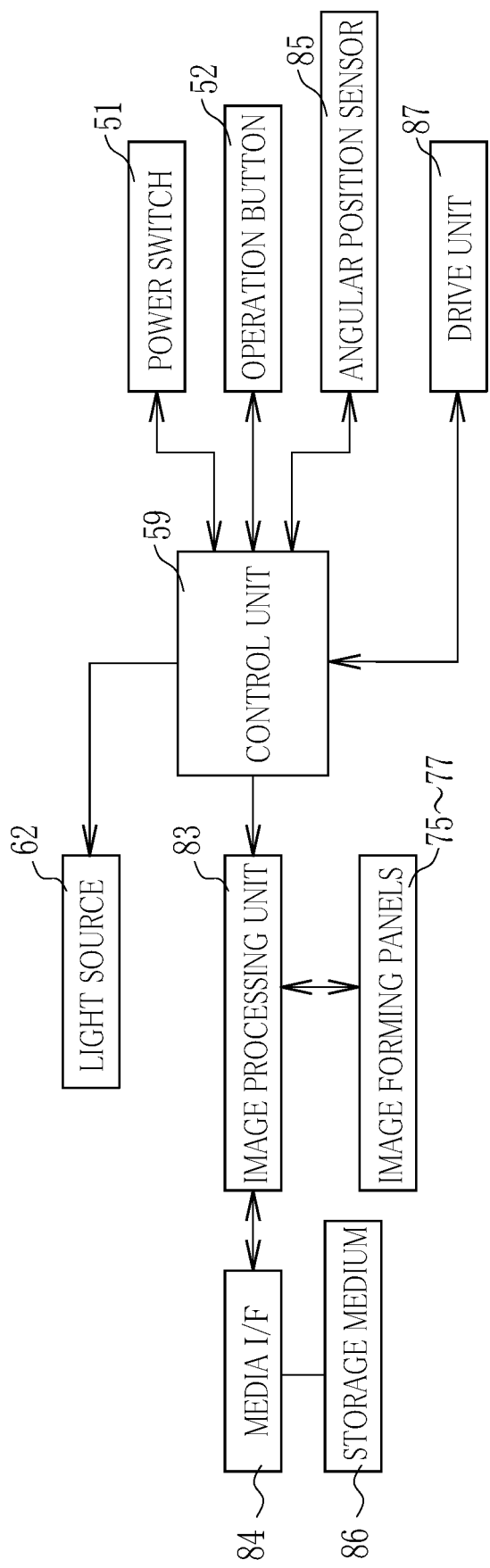
FIG. 7 is a block diagram showing a modification of the electrical configuration of the projector.

The electrical configuration of the projector is not limited to that shown in FIG. 6. As shown in FIG. 7, the projector may be configured to include a drive unit 87 that drives the projection lens 10 between the first position and the second position. The drive unit 87 includes a drive motor that rotates the projection lens 10 about the optical axis CL1. In this case, the power switch 51 functions as an operation switch for starting/stopping power supply to each part in the housing 55 such as the light source 62, the image forming panels 75 to 77, and the drive unit 87. When the power switch 51 is turned on, the control unit 59 controls the drive unit 87 to drive the projection lens 10 from the first position to the second position after the start of power supply. When the power switch 51 is turned off, the drive unit 87 is controlled to drive the projection lens 10 from the second position to the first position, and then power supply is stopped.

Second Embodiment

Figure 8:
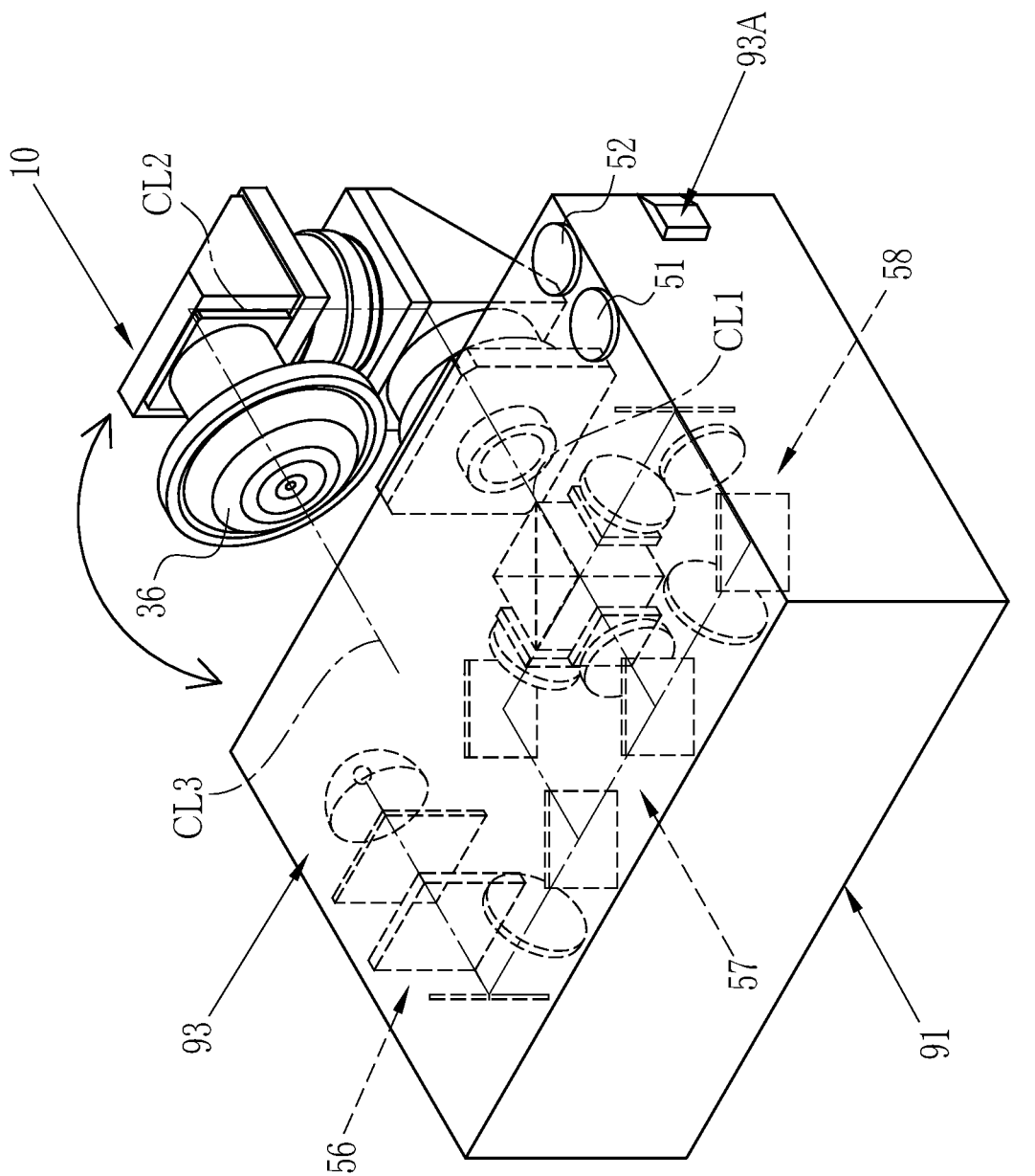
FIG. 8 is a perspective view showing a usage state of a projector of a second embodiment.
Figure 9:
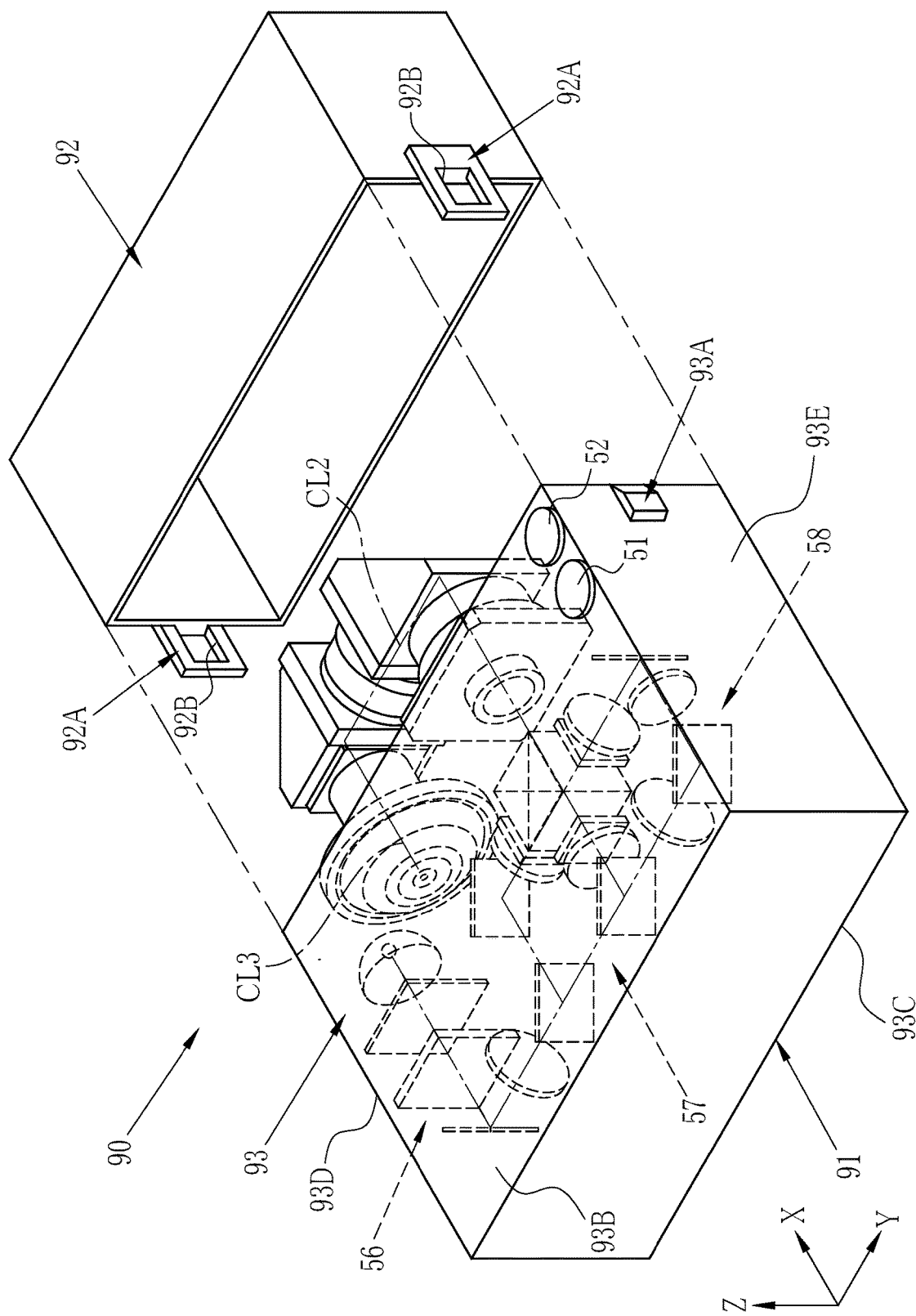
FIG. 9 is a perspective view showing a storage state of the projector of the second embodiment.

In the first embodiment, the storage section 61 is provided in the projector body 50, and when the projection lens 10 is at the first position, the storage section 61 is arranged inside the storage section 61. However, the present invention is not limited to this, and the second embodiment described below may be used. As shown in FIGS. 8 and 9, it may be configured to include a cover member that is connected to housing and covers the projection lens 10 when the projection lens 10 is at the first position.

In this embodiment, a projector 90 includes a projector body 91, the projection lens 10, and a cover member 92. The projector body 91 has a substantially rectangular parallelepiped shape, and has a rear face on which the projection lens 10 is attached. The internal structure of the projector body 91 is the same as that of the projector body 50 of the first embodiment.

An engagement protrusion 93A for connection is provided on both sides of a housing 93 of the projector body 91. The cover member 92 is formed in a box shape that houses the projection lens 10, and a locking piece 92A is provided at a position corresponding to the engagement protrusion 93A.

The locking piece 92A has an engagement hole 92B. When the cover member 92 covers the projection lens 10, the engagement protrusion 93A engages the engagement hole 92B to lock the locking piece 92A. Thereby, the cover member 92 is connected to the projector body 91.

As same as in the first embodiment, when at the first position, the projection lens 10 is housed in a position that does not project from an upper surface 93B, a bottom surface 93C which is the second surface of the housing 93, and side surfaces 93D and 93E in the Z-axis direction and the Y-axis direction. Further, when the projection lens 10 is at the first position, the cover member 92 is connected to the projector body 91, so that the projection lens 10 can be prevented from being damaged or performance deterioration due to dirt.

On the other hand, as same as in the first embodiment, when at the second position, the projection lens 10 projects from the upper surface 93B of the housing 93 in the Z-axis direction, and the sixth lens 36 of the third optical system 13 is exposed.

Third Embodiment

In the first and second embodiments, a transmissive liquid crystal panel is used for the image forming panels 75 to 77. However, in the third embodiment described below, a DMD panel may be used as shown in FIGS. 10 to 13.

Figure 10:
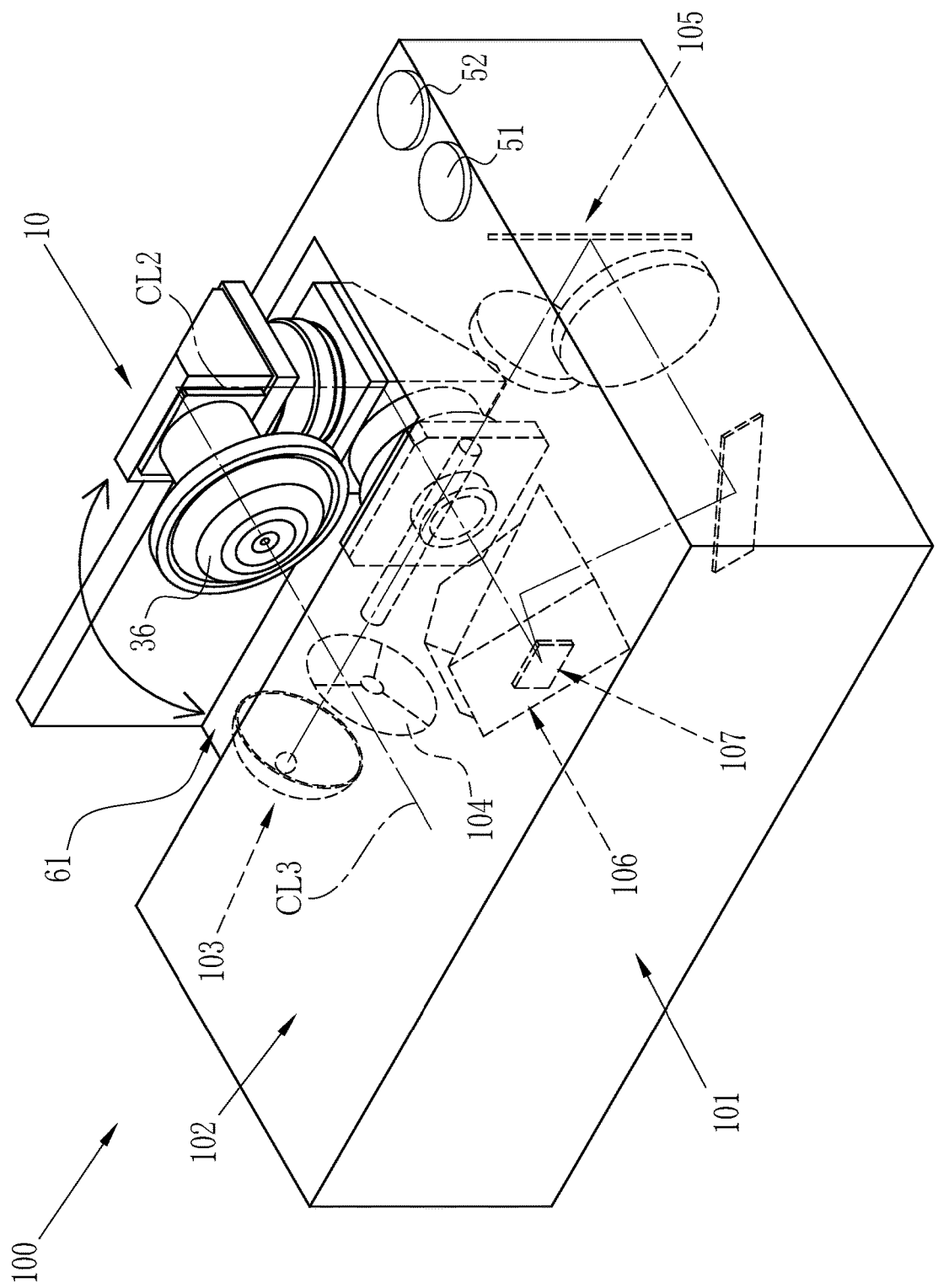
FIG. 10 is a perspective view showing a usage state of a projector of a third embodiment.
Figure 11:
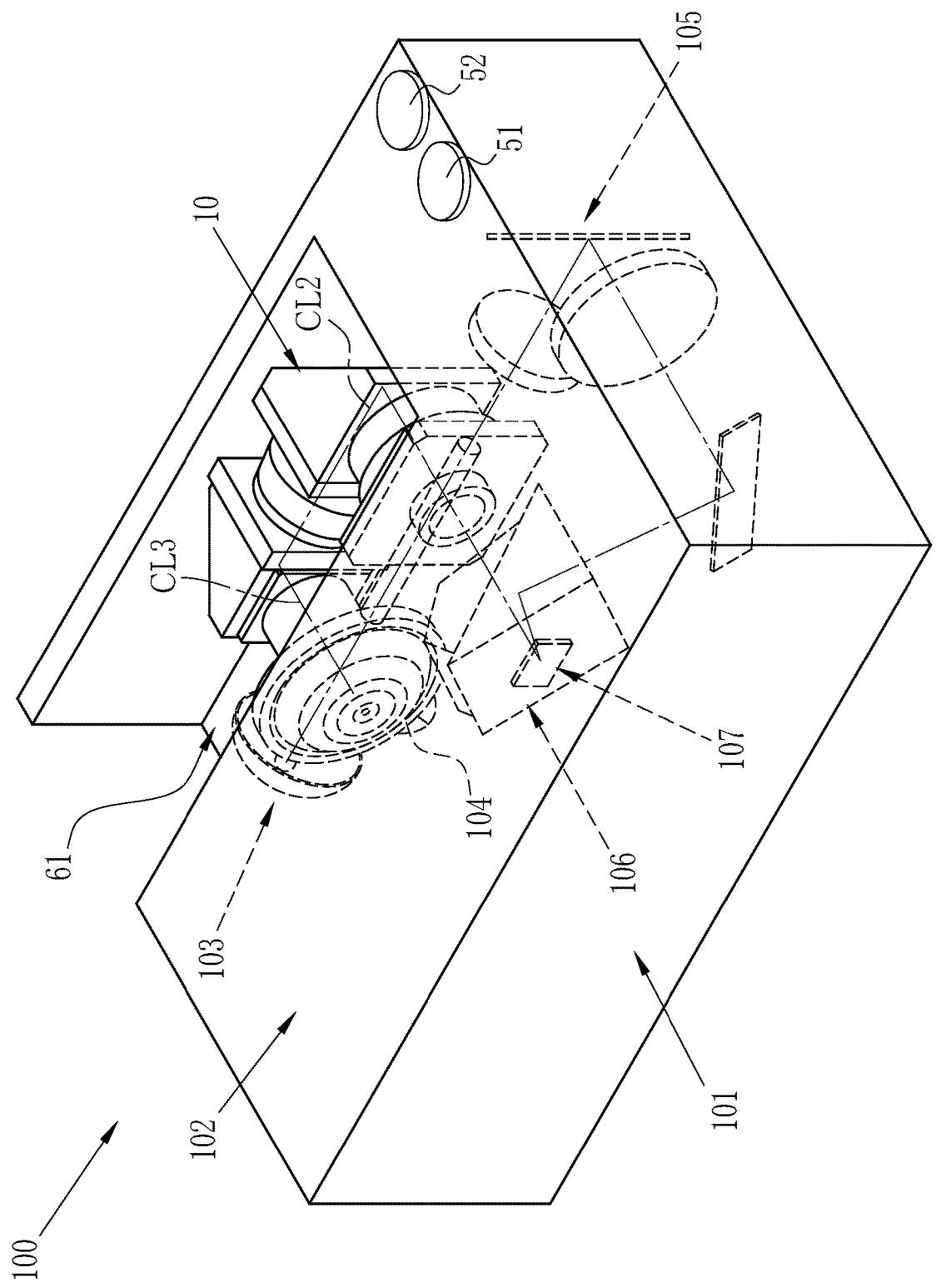
FIG. 11 is a perspective view showing a storage state of the projector of the third embodiment.
Figure 12:
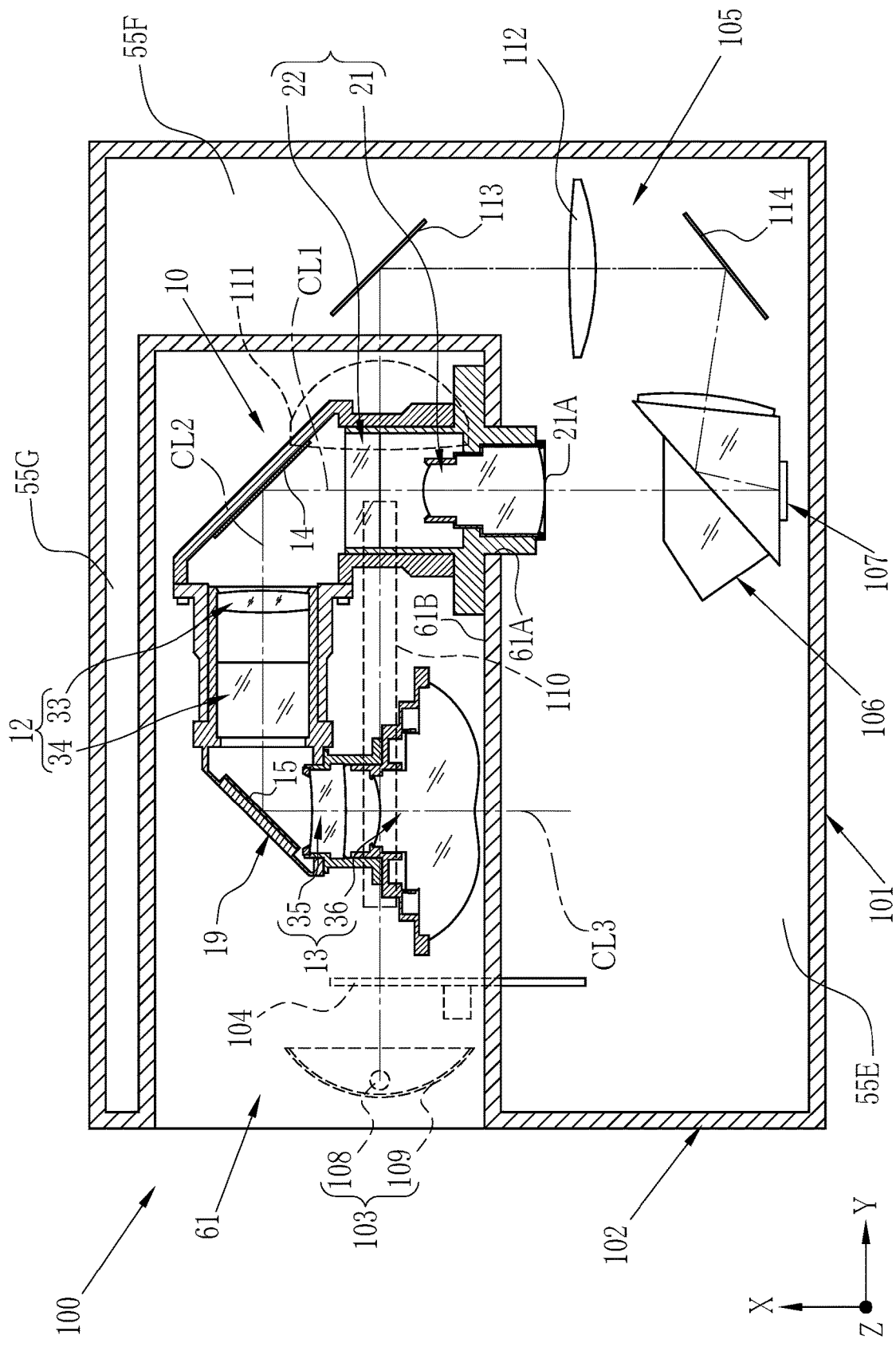
FIG. 12 is a cross-sectional view of the main part of the projector of the third embodiment.
Figure 13A:
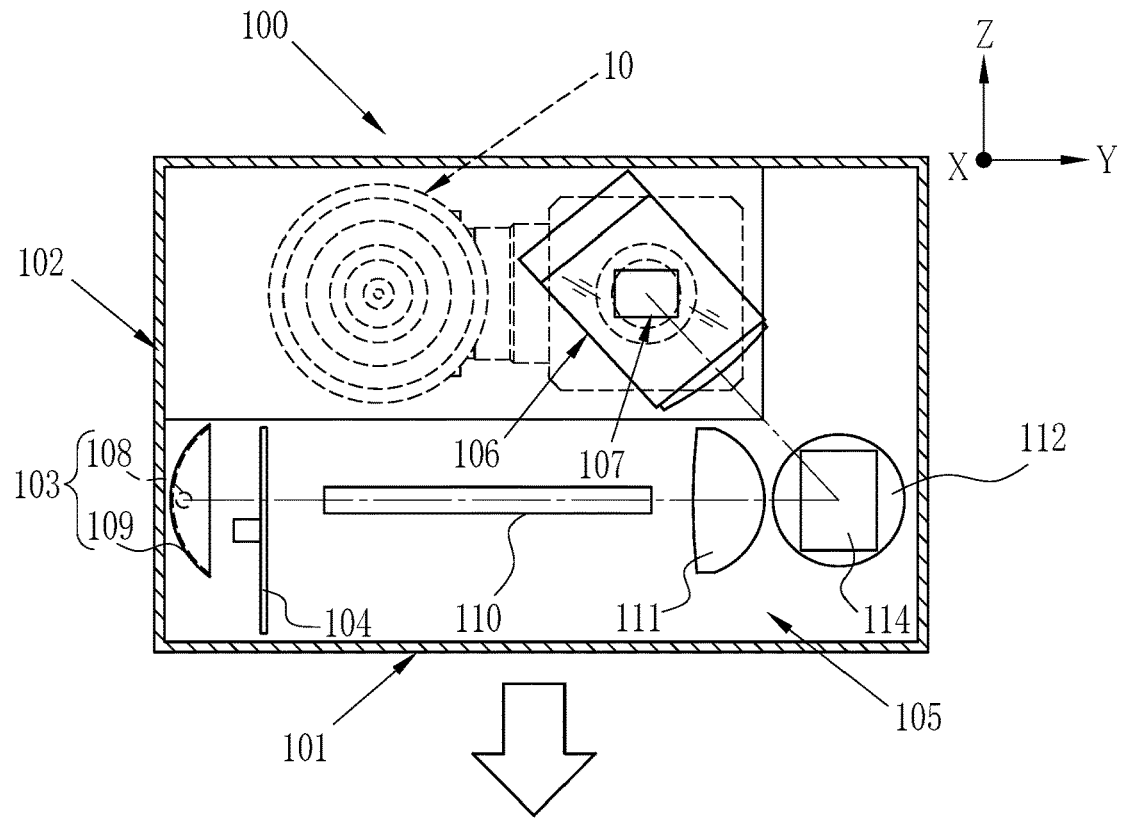
FIGS. 13A and 13B are schematic diagrams of the projector of the third embodiment for explaining a rotation of a projection lens from a first position (FIG. 13A) to a second position (FIG. 13B).
Figure 13B:
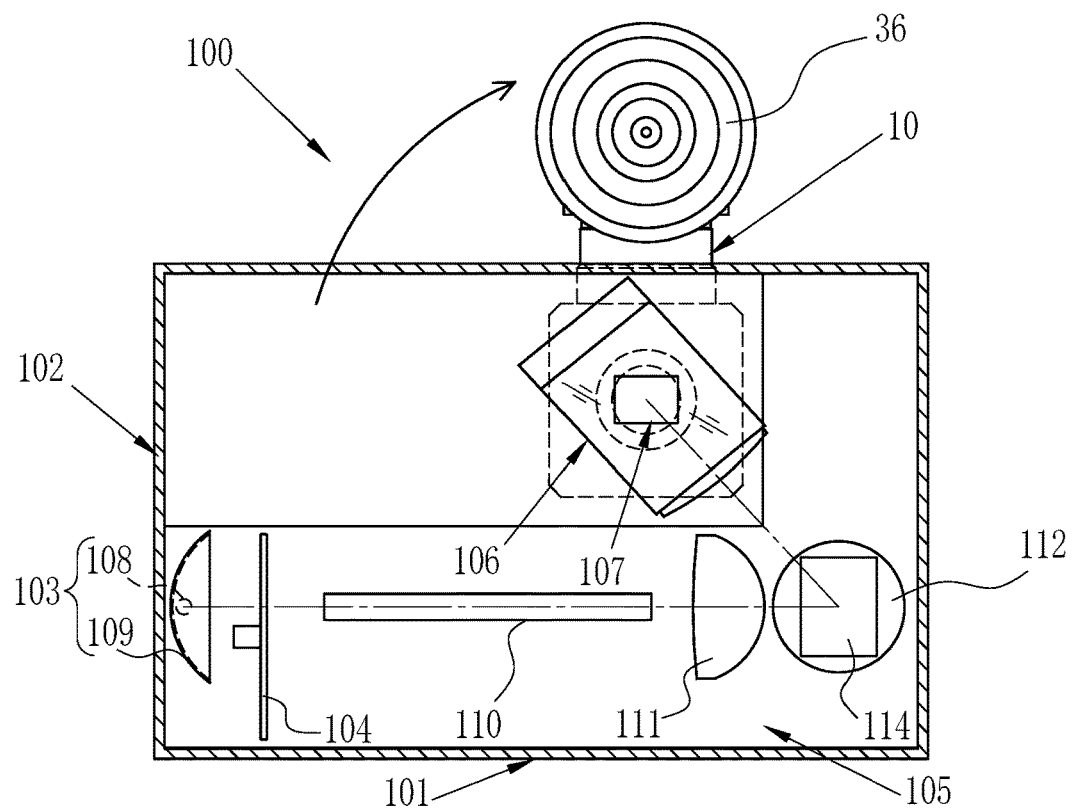

As shown in FIGS. 10 and 11, a projector 100 includes a projector body 101 and the projection lens 10. The storage section 61 same as in the first embodiment is provided in a housing 102 of the projector body 101. The projection lens 10 is arranged inside the storage section 61 when at the first position, as same as in the first embodiment. That is, the projection lens 10 is housed in a position that does not protrude from the housing 102 in the Z-axis direction and the Y-axis direction. On the other hand, when the projection lens 10 is at the second position, the projection lens 10 is disposed at a position protruding from the housing 102. That is, the projection lens 10 projects from the upper surface of the housing 102 in the Z-axis direction, and the sixth lens 36 is exposed.

The housing 102 of the projector body 101 contains a light source unit 103, a color wheel 104, an illumination optical system 105, a prism device 106, and a DMD panel 107.

The light source unit 103 includes a light source 108 that emits white light with high luminance and a reflector 109. The color wheel 104 includes each color filter that transmits only red light, green light, and blue light on a disk serving as a substrate at a predetermined interval in the circumferential direction. As the color wheel 104 rotates, the white light from the light source 108 is color-separated by a predetermined time unit and is incident on the illumination optical system 105. The illumination optical system 105 converts the color-separated light source light into illumination light having a uniform light amount distribution so that the image projected on the screen 37 does not have deviation in brightness.

The illumination optical system 105 includes a rod integrator 110, relay lenses 111 and 112, and mirrors 113 and 114. The rod integrator 110 is made of, for example, glass formed in a quadrangular prism shape, and light transmitted through the color wheel 104 enters from one end. The light that has entered the rod integrator 110 undergoes total internal reflection a plurality of times, becomes irradiation light with uniform brightness, and exits from the other end. The light emitted from the light source unit 103 is superimposed on the projection lens 10. The light then enters the rod integrator 110. The irradiation light emitted from the rod integrator 110 enters the prism device 106 via the relay lenses 111 and 112 and the mirrors 113 and 114, and then enters the projection lens 10. That is, the light emitted from the light source unit 103 has a long optical path length because the light uses the inside of the first protruding section 55F and the inside of the central section 55E as the optical path.

Note that the light source unit 103, the color wheel 104, and the illumination optical system 105 are disposed below the prism device 106, the projection lens 10, and the storage section 61 in the Z-axis direction. In this embodiment, since the optical path of the irradiation light is bent by the mirrors 113, 114, and so on, the light source 108 is offset with respect to the optical axis CL1 of the projection lens 10, and the light source 108 is arranged in a position shifted from the first optical system 11 in the Y-axis direction. Further, the light source 108 is shifted from the first optical system 11 also in the Z-axis direction.

As described above, when the projection lens 10 is set to the first position, the third optical system 13 is arranged in a position shifted from the first optical system 11 in the Y-axis direction. In this embodiment, when the projection lens 10 is at the first position, the third optical system 13 is located on the same side as the light source 108 with respect to the optical axis CL1 in the Y-axis direction. Thereby, when the projection lens 10 is set to the first position as same as in the first embodiment, the dimension in the Y-axis direction can be reduced, and the projector 100 as a whole can be made compact.

The irradiation light incident on the prism device 106 is incident on the DMD panel 107. As is well known, the DMD panel 107 is provided with a number of micro mirrors that reflect irradiation light, and modulates the irradiation light for each pixel to image light having image information. The prism device 106 guides the irradiation light to the DMD panel 107 and emits the image light from the DMD panel 107 to the projection lens 10. The projection lens 10 forms the image light on the screen 37, so that the image is enlarged and projected.

Figure 14:
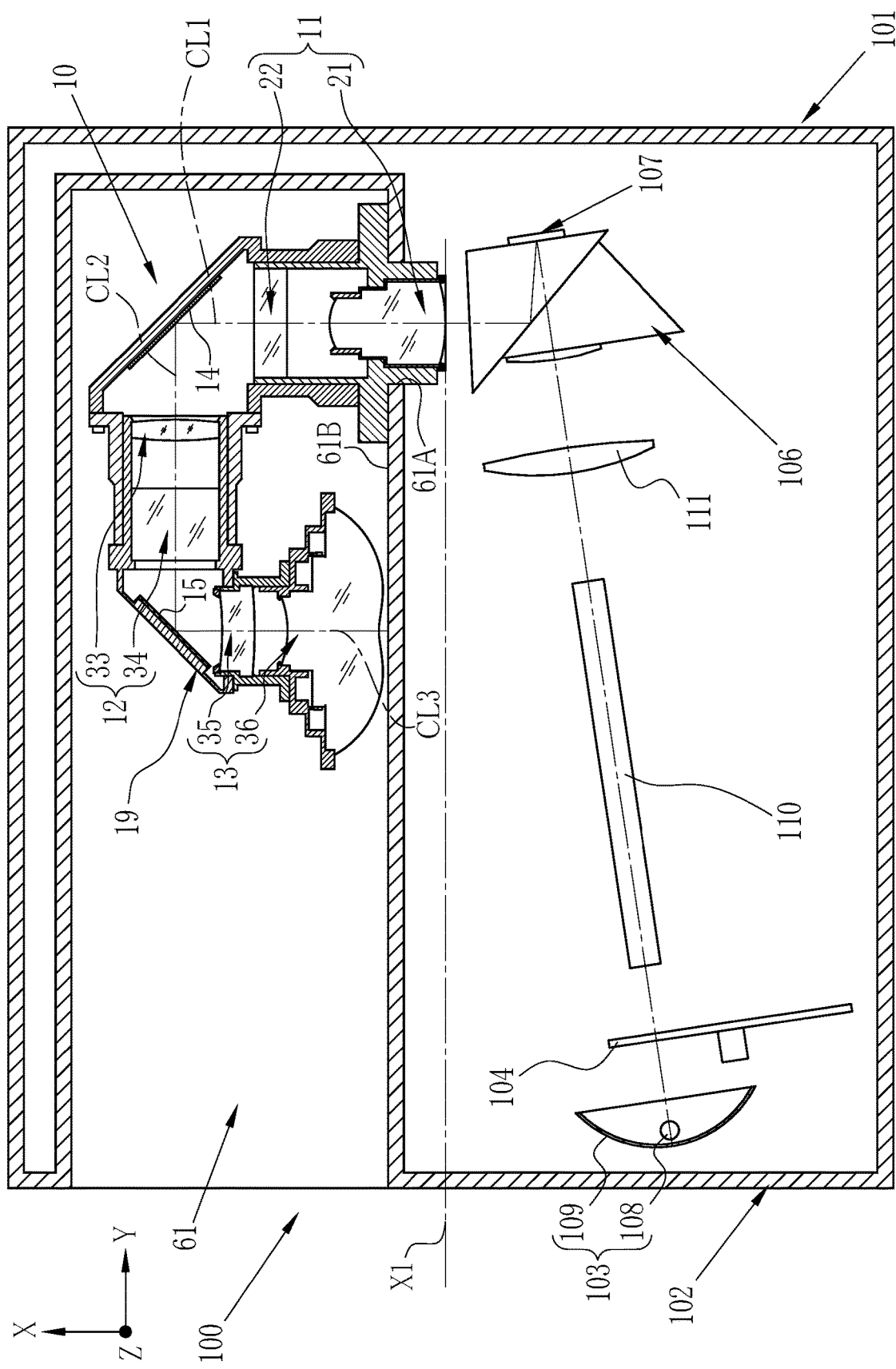
FIG. 14 is a cross-sectional view of a main part showing a modification of the third embodiment.

Note that as a modification of the third embodiment, as shown in FIG. 14, the irradiation light may be incident on the prism device 106 without bending the optical path of the illumination optical system 105. In this case, the light source unit 103, the color wheel 104, and the illumination optical system 105 are arranged at positions facing the prism device 106 and the DMD panel 107 without using the mirrors 113 and 114. Also in this case, in the Y-axis direction, the third optical system 13 is located on the same side as the light source 108 with respect to the optical axis CL1. Thereby, when the projection lens 10 is set to the first position as same as in the above embodiments, the dimension in the Y-axis direction can be reduced, and the projector 100 as a whole can be made compact.

In each of the above embodiments has been described in the state in which the projector is placed on a table. However, the present invention can be applied to a state in which the projector is suspended from a ceiling or the like. Further, although the example in which an image is projected onto the screen 37 has been described, the projection target is not limited to the screen 37, and a projector can project an image onto various projection targets.

In the above embodiments, terms such as orthogonal and parallel are used to represent the positional relationship between a plurality of optical axes, and specific numerical angles such as 90° are used for explanation. However, these include a range of an allowable error with respect to the accuracy required in the optical system.

EXPLANATION OF REFERENCES 2 projector
10 projection lens
11 first optical system
12 second optical system
13 third optical system
14 first mirror
15 second mirror
16 first holding member
17 second holding member
18 third holding member
19 lens barrel
21 first lens
21A tip face
22 second lens
23 imaging plane
24 first body part
25 first lens frame
26 first mounting tube
27 fitting portion
28 mounting flange
29 second mounting tube
31 second body part
31a lower plate
31b inclined surface portion
32 third mounting tube
33 third lens
34 fourth lens
35 fifth lens
36 sixth lens
37 screen
38 second lens frame
39 third body part
39a upper plate
39b inclined surface portion
41 third lens frame
41a flange
50 projector body
51 power switch
52 operation button
55 housing
55A upper surface
55B bottom surface
55C side surface
55D side surface
55E central section
55F first protruding section
55G second protruding section
56 light source unit
57 color separation unit
58 image forming unit
59 control unit
61 storage section
61A fitting hole
61B mounting surface
62 light source
63 reflector
64 fly-eye lens
65 fly-eye lens
66 polarization converting element
67 mirror
68 condenser lens
69 dichromic mirror
71 dichromic mirror
72 relay lens
73 mirror
74 relay lens
75 image forming panel
76 image forming panel
77 image forming panel 78 mirror
79 mirror
81 condenser lens
82 cross dichroic prism
82a dichroic surface
82b dichroic surface
83 image processing unit
84 media I/F
85 angular position sensor
86 storage medium
87 drive unit
90 projector
91 projector body
92 cover member
92A locking piece
92B engagement hole
93 housing
93A engagement protrusion
93B upper surface
93C bottom surface
93D side surface
93E side surface
100 projector
101 projector body
102 housing
103 light source unit
104 color wheel
105 illumination optical system
106 prism device
107 DMD panel
108 light source
109 reflector
110 rod integrator
111 relay lens
112 relay lens
113 mirror
114 mirror

What is claimed is:

1. A projector comprising:
an image forming panel for displaying images;
a light source that illuminates the image forming panel;
a housing that houses the image forming panel and the light source, and includes a first surface and a second surface intersecting the first surface; and
a projection lens attached to the first surface, the projection lens including a first holding member through which light with a first optical axis passes, a first reflective member which bends the first optical axis to form a second optical axis, and a second holding member through which the light with the second optical axis passes,
wherein the projection lens is rotatable around the first optical axis between a first position where the second holding member faces along the long side direction of the first surface and a second position where the second holding member protrudes from the second surface in a side view, and
wherein the housing includes a central section and a protruding section protruding from the central section, and light emitted from the light source enters the projection lens using the central section and the protruding section as an optical path.

2. A projector comprising:
an image forming panel for displaying images;
a light source that illuminates the image forming panel;
a housing that houses the image forming panel and the light source, and includes a first surface and a second surface intersecting the first surface; and
a projection lens attached to the first surface, the projection lens including a first holding member through which light with a first optical axis passes, a first reflective member which bends the first optical axis to form a second optical axis, and a second holding member through which the light with the second optical axis passes,
wherein the projection lens is rotatable around the first optical axis between a first position where the second holding member faces along the long side direction of the first surface and a second position where the second holding member protrudes from the second surface in a side view,
wherein the housing includes a central section and a protruding section protruding from the central section in a first direction,
wherein the projection lens is attached to a first surface of the central section in the first direction,
wherein a second direction intersecting the first direction includes one side and the other side,
wherein in a plane view, the side on which the protruding portion is located with respect to the central position of the housing in the second direction is the one side, and
wherein in case the projection lens is in the first position, the second holding member is aligned with the protruding portion in the second direction, opposite the first surface in the first direction and extending from the first holding member to the other side.

3. The projector according to claim 1,
wherein light emitted from the light source enters the projection lens after entering the central section through the protruding portion.

4. The projector according to claim 2,
wherein light emitted from the light source enters the projection lens after entering the central section through the protruding portion.

5. The projector according to claim 3,
wherein in the central section, light emitted from the light source includes an optical path advancing from the one side to the other side and an optical path advancing from the other side to the one side.

6. The projector according to claim 4,
wherein in the central section, light emitted from the light source includes an optical path advancing from the one side to the other side and an optical path advancing from the other side to the one side.

7. The projector according to claim 1, further comprising:
an operation button for operating the projector, or a power switch for switching on/off the power supply to the projector,
wherein the operation button or the power switch is formed in the protruding section.

8. The projector according to claim 2, further comprising:
an operation button for operating the projector, or a power switch for switching on/off the power supply to the projector,
wherein the operation button or the power switch is formed in the protruding section.

9. The projector according to claim 1,
wherein in the first direction, the light source is disposed at a position protruding toward the projection lens side with respect to the housing, from the front end surface of the optical system on the image forming panel side of the projection lens.

10. The projector according to claim 2,
wherein in the first direction, the light source is disposed at a position protruding toward the projection lens side with respect to the housing, from the front end surface of the optical system on the image forming panel side of the projection lens.

11. The projector according to claim 1, further comprising:
a control unit that turns off the light source when the projection lens is rotated from the second position to the first position.

12. The projector according to claim 2, further comprising:
a control unit that turns off the light source when the projection lens is rotated from the second position to the first position.

13. The projector according to claim 1,
wherein the light in the projection lens includes the first optical axis, the second optical axis, and a third optical axis that travels in a direction opposite to the traveling direction of the first optical axis.

14. The projector according to claim 2,
wherein the light in the projection lens includes the first optical axis, the second optical axis, and a third optical axis that travels in a direction opposite to the traveling direction of the first optical axis.

15. The projector according to claim 1,
wherein the first surface is between the light source and the projection lens when the projection lens is at the first position.

16. The projector according to claim 2,
wherein the first surface is between the light source and the projection lens when the projection lens is at the first position.

17. The projector according to claim 1,
wherein the diameter of an exit lens at the tip of the projection lens is shorter than the length of the first surface in the short side direction.

18. The projector according to claim 2,
wherein the diameter of an exit lens at the tip of the projection lens is shorter than the length of the first surface in the short side direction.

19. The projector according to claim 2,
wherein in the second direction, the attachment position of the first holding member on the first surface is closer to the protruding portion than the edge of the other side of the first surface.

* * * * *